（12）United States Patent
Bober et al.

(10) Patent No.: US 12,328,402 B2
(45) Date of Patent: Jun. 10, 2025

(54) SECURING DATA TRANSACTIONS THROUGH A DISTRIBUTED LEDGER SYSTEM

(71) Applicant: Dell Products L.P., Round Rock, TX (US)

(72) Inventors: Roman Bober, Ashdod (IL); Stav Sapir, Beer Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 18/468,264

(22) Filed: Sep. 15, 2023

(65) Prior Publication Data

US 2025/0097057 A1    Mar. 20, 2025

(51) Int. Cl.
*H04L 9/00*     (2022.01)
*G06F 16/23*    (2019.01)
*H04L 9/30*     (2006.01)

(52) U.S. Cl.
CPC ............ *H04L 9/50* (2022.05); *G06F 16/2379* (2019.01); *H04L 9/30* (2013.01)

(58) Field of Classification Search
None
See application file for complete search history.

(56) References Cited

U.S. PATENT DOCUMENTS

| | | | |
|---|---|---|---|
| 11,310,044 B2 * | 4/2022 | Keskar | G06Q 20/40 |
| 2019/0034923 A1 * | 1/2019 | Greco | G06Q 20/383 |
| 2020/0311724 A1 * | 10/2020 | Dunjic | H04L 9/0819 |
| 2022/0085980 A1 * | 3/2022 | Muthukrishnan | H04L 9/3236 |
| 2023/0163970 A1 * | 5/2023 | Riggan | H04L 9/50 |
| | | | 713/168 |
| 2024/0029061 A1 * | 1/2024 | Reed | H04L 63/126 |
| 2025/0097057 A1 * | 3/2025 | Bober | G06F 16/2379 |

* cited by examiner

*Primary Examiner* — Atta Khan
(74) *Attorney, Agent, or Firm* — WOMBLE BOND DICKINSON (US) LLP

(57) ABSTRACT

Methods and systems for storing data are disclosed. To store data, transactions may be generated and sent to a storage system. Hashes of the transaction may also be generated and distributed to ledger agents of a distributed ledger system. The hashes of the transaction may be used by the storage system to verify integrity of the transaction. To establish trust in the ledger agents, the storage system may require that the hashes of the transaction be signed with a private key. The private key may be protected with multiple protection mechanisms.

20 Claims, 6 Drawing Sheets

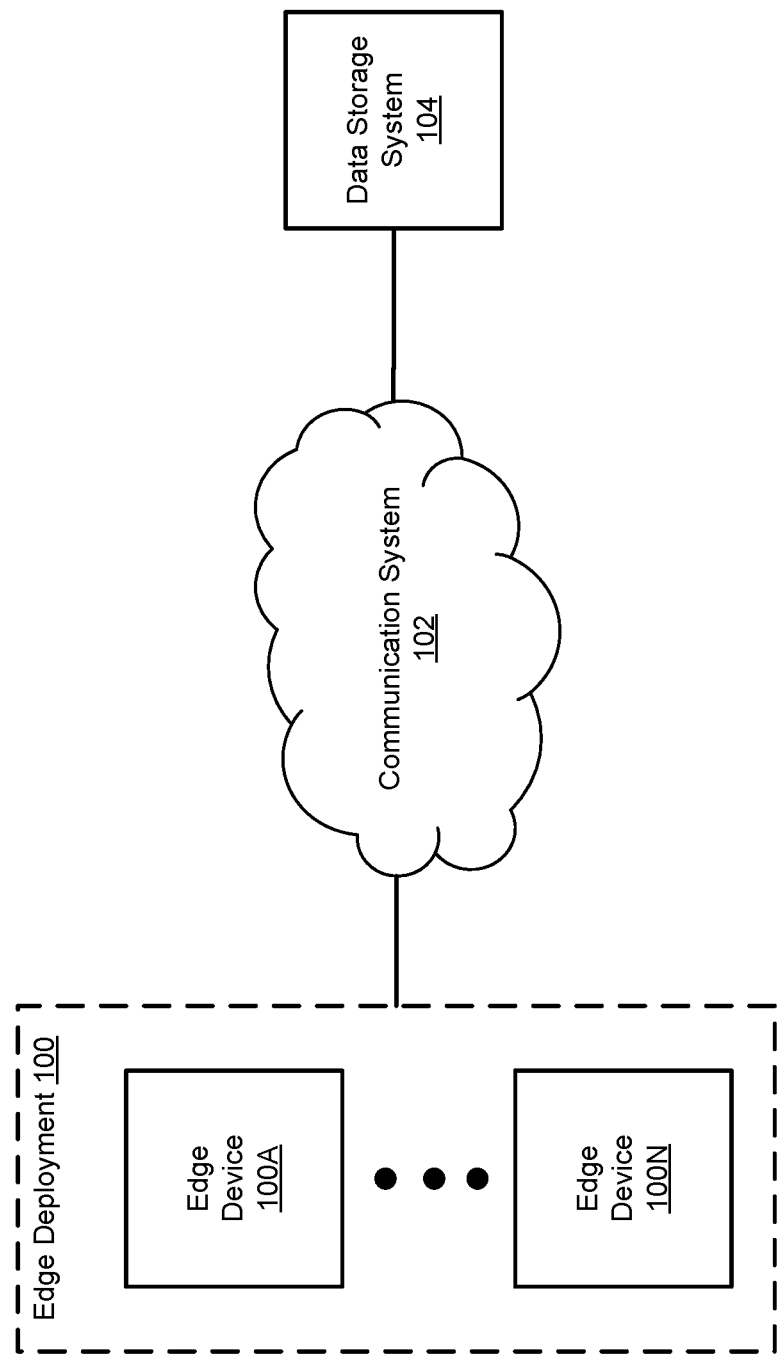

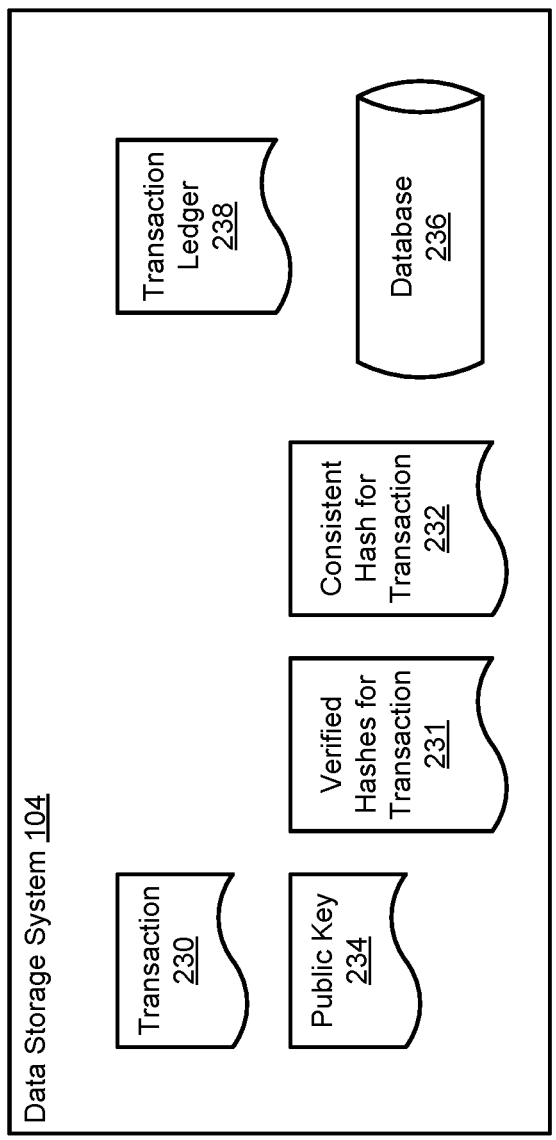

SECURING DATA TRANSACTIONS THROUGH A DISTRIBUTED LEDGER SYSTEM

FIELD

Embodiments disclosed herein relate generally to data storage. More particularly, embodiments disclosed herein relate to securing storage of data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a diagram illustrating a system in accordance with an embodiment.

FIGS. 2A-2C show data flow diagrams in accordance with an embodiment.

DETAILED DESCRIPTION

Figure 2A:
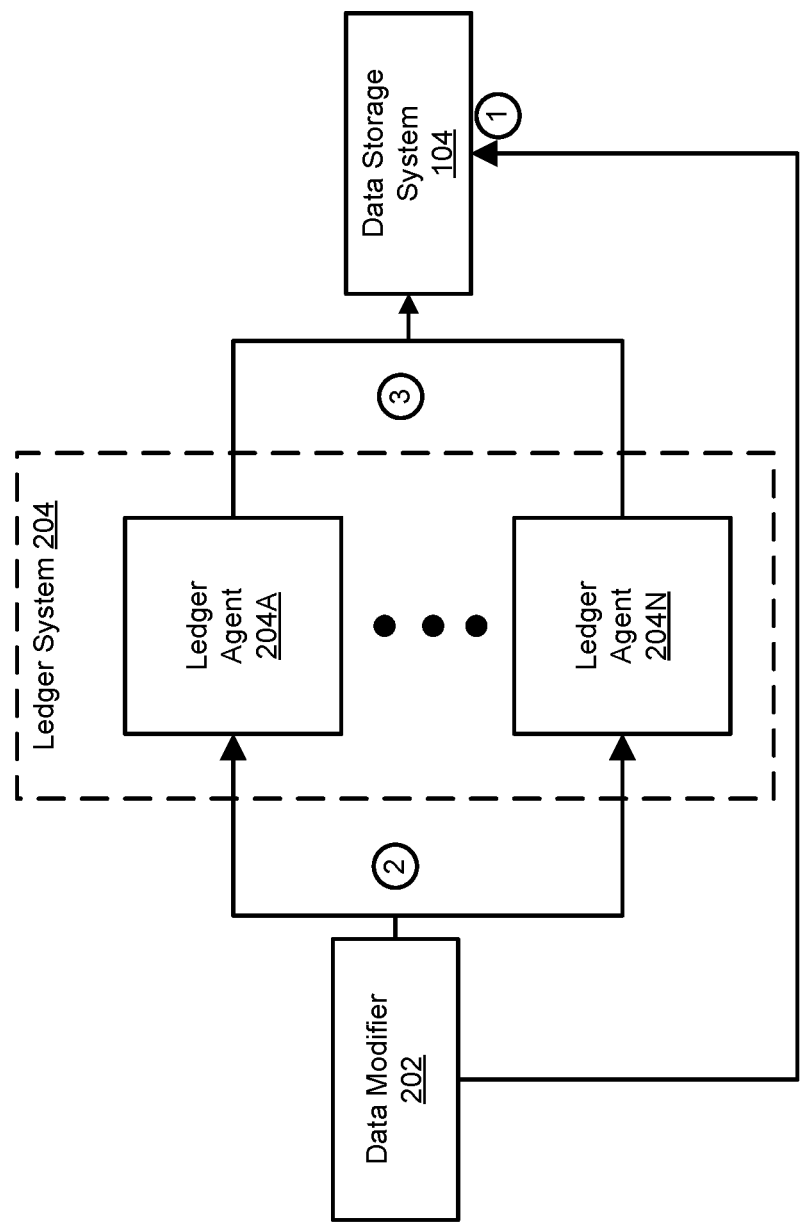

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for securing storage of data using a distributed ledger system. The data may be stored by generating and sending transactions to a storage system. The distributed ledger system may facilitate secure distribution of hash values of the transactions to the storage system. The hash values may be generated using a secure hash algorithm (SHA). The hash values may be secured by requiring that each hash value be signed using a private key protected using key encryption key (KEK) using a secret protected by a distributed key protection algorithm.

To verify the transaction using the distributed ledger system, the data storage system may retrieve copies of the signed hash value from a portion of the ledger systems. The signed hash values may be verified using a public key and used to establish a consistent hash value for the transaction.

Once obtained, the consistent hash value may be used to verify integrity of the transactions. If verified, the transaction may be processed to store the data.

Thus, embodiments disclosed herein may address, among others, the technical problem of trust in a distributes system. The disclosed system may facilitate establishment of trust through verification of transactions using hashes maintained by a distributed ledger system. The use of the distributed ledger system may improve the likelihood of the integrity of the data being maintained by reducing an impact of compromise of devices in the system. For example, compromise of some ledger agents may not compromise the ability of the system to verify the integrity of data transmitted through the system. So long as a majority of the ledger agents remain uncompromised, then the integrity of data transmission may be maintained even if some ledger agents are compromised.

In an embodiment, a method for securing database transactions is provided. The method may include (i) obtaining a transaction from a data modifier, the transaction documenting a change to data maintained by a database and (ii) responsive to obtaining the transaction: (a) selecting ledger agents for verification of the transaction, the ledger agents storing hash values usable to verify the transaction; (b) obtaining signed copies of the hash values from the ledger agents; (c) attempting to verify authenticity of the signed copies of the hash values using a public key to identify a first portion of the copies of the hash values that are trustworthy; (d) obtaining a consistent hash value using the first portion of the copies of the hash values that are trustworthy; (e) attempting to verify the transaction using the consistent hash value; (f) processing the transaction to update the database, in a first instance of the attempting to verify the transaction where the transaction is verifiable; and (g) rejecting the transaction, in a second instance of the attempting to verify the transaction where the transaction cannot been verified.

The data modifier may generate the hash values and provides them to the ledger agents.

Selecting the ledger agents may include selecting, by a random selection process, a subset of ledger agents from a set of ledger agents, the subset comprising more than half of all of the ledger agents from the set of the ledger agents.

Obtaining the consistent hash value may include (i) identifying duplicative hash values of the hash values; (ii) using the duplicative hash values as the consistent hash value, in a first instance of the identifying the duplicative hash values where all of the hash values are the duplicative hash values; and (iii) in a second instance of the identifying the duplicative hash values where all of the hash values are not the duplicative hash values: (a) isolating a portion of the ledger agents that provided the hash values that are not the duplicative hash values; (b) selecting a new portion of the ledger agents, a size of the new portion of the ledger agents equal to a size of the portion of the ledger agents that provided the hash values that are not the duplicative hash values; and (c) obtaining additional hash values from the new portion of the ledger agents to attempt to obtain the consistent hash value.

The public key may be a member of a public-private key pair, signatures of the signed copies of the hash values being based on a private key of the public-private key pair, the private key being protected by the ledger agents using key encryption key based on a symmetric key, the symmetric key being protected by the ledger agents using a distributed key protection algorithm.

The distributed key protection algorithm may be Shamir's Secret Protection Algorithm.

A first communication path for the transaction may be between the data modifier and the database and may be separate from a second communication path between the ledger agents and the database.

Attempting to verify the transaction using the consistent hash value may include (i) computing a second hash value of the transaction; (ii) comparing the second hash value of the transaction with the consistent hash value; (iii) treating the consistent hash value as being verified, in a first instance of the comparing where the second hash value is duplicative of the consistent hash value; and (iv) treating the consistent hash value as being unverifiable, in a second instance of the comparing where the second hash value is not duplicative of the consistent hash value.

Processing the transaction may include updating a local copy of a transaction ledger with the transaction and applying changes of the transaction to the database.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include edge deployment 100. Edge deployment 100 may be deployed to a location where the computer implemented services are consumed.

While data may be collected, generated, and/or otherwise obtained through edge deployment 100 as part of the provided computer implemented services, the collected data may need to be, for example, aggregated with other data for processing, aggregated in a more secure storage location for long term storage, and/or otherwise aggregated elsewhere for other purposes. For example, data from edge deployment 100 may be aggregated in data storage system 104.

However, aggregating data in data storage system 104 may present opportunities for malicious entities to, for example, compromise the data stored in data storage system 104. For example, a malicious entity may attempt to disrupt or modify data from edge deployment 100 as it is transmitted and/or otherwise provided to data storage system 104. If successfully disrupted or modified, the resulting data stored in data storage system 104 may be different from that obtained by edge deployment 100. Consequently, downstream uses of the data aggregated in data storage system 104 may be impacted by the maliciously modified data.

For example, if a downstream consumer of the data stored in data storage system 104 makes various decisions based on the data, the decisions may be tainted based on the changes to the data made by the malicious entities.

In general, embodiments disclosed here relate to systems and methods for maintaining the integrity of data in a distributed system. The integrity of the data may be maintained by validating transmissions of data from edge devices 100A-100N to other systems, such as data storage system 104. To validate the data transmission, the data may be treated as logical transactions (e.g., adding data, deleting data, changing data, etc.) to be applied to a data set such as a database.

To allow for a transaction to be validated by a receiving device, a sending device may send a copy of the transactions via a first path to the receiving device and multiple copies of hashes of the transaction along different paths to the receiving device. Each of these other transmission paths may include another device (e.g., another edge device) that may operate as a ledge agent. Each ledger agent may maintain a ledger of the hashes of the transactions sent to the receiving device. The hashed transactions may be used by the receiving device (e.g., data storage system 104) to verify the integrity of the transaction.

To verify the integrity of the transactions in a manner that reduces the likelihood of compromises of the ledger agent impacting the integrity verification process, the receiving device (e.g., data storage system 104) may select a subset of the ledger agents (e.g., some of edge device 100A-100N). Signed copies of the hash of the transaction may be retrieved from the ledger agents, and may be used to determine whether the transaction received from the sending device is authentic. At least a majority of the copies of the signed hash of the transaction may need to match for the signed hash to be treated as authentic. If authentic, the receiving device may apply or otherwise use the transaction to store data from the sending device.

To reduce the impact of compromises of the ledger agents, each of the ledger agents may utilize a private key that may be encrypted using a key encryption key (KEK) algorithm to sign the copies of the hashes of transactions that they receive from the sending device. The private key from the subset of ledger agents may be obtained by solving for a decryption key from a distributed key protection algorithm implemented by the ledger agents. The decryption key may be used to access the private key protected by the KEK algorithm. Thus access to the private key usable to sign the hashes may not be available to compromised ledger agents because the compromised ledger agents. Consequently, if the receiving device receives a signed hash of a transaction that cannot be validated, then the receiving device may conclude that the ledger agent that provided the hash has been compromised or is untrustworthy for other reasons.

Apart from the hashed transactions from the subset of the ledger agents, the receiving device may obtain a separate hash of the transaction. The separate hash may be compared to a hash from the ledger agents that has been deemed authentic. If all of the hashes are consistent, then the receiving device may treat the transaction as trustworthy, and may update a database (or other type of data structure) using the transaction. Otherwise, if the hashes are inconsistent, (i) a remediation may be performed on the ledger agents that provided inconsistent hashes and/or hashes that could not be verified, and (ii) other ledger agents not included in the subset may be selected to search for a hashes that are consistent and verifiable.

To provide the above noted functionality, the system may include edge deployment 100, edge device 100A-100N, data storage system 104, and communication system 102. Each of these components is discussed below.

Edge deployment 100 may include any number of edge devices (e.g., 100A-100N). Edge device 100A-100N may provide computer implemented services. As part of the computer implemented services, any of edge devices 100A-100N may serve as a transmitting device and/or a ledger agent.

When serving as a transmitting device, the edge device may generate a transaction and a hash of the transaction. The transaction may be provided to a receiving device, such as data storage system 104. Copies of the hash of the transaction may be distributed to the ledger agents.

Figure 2B:
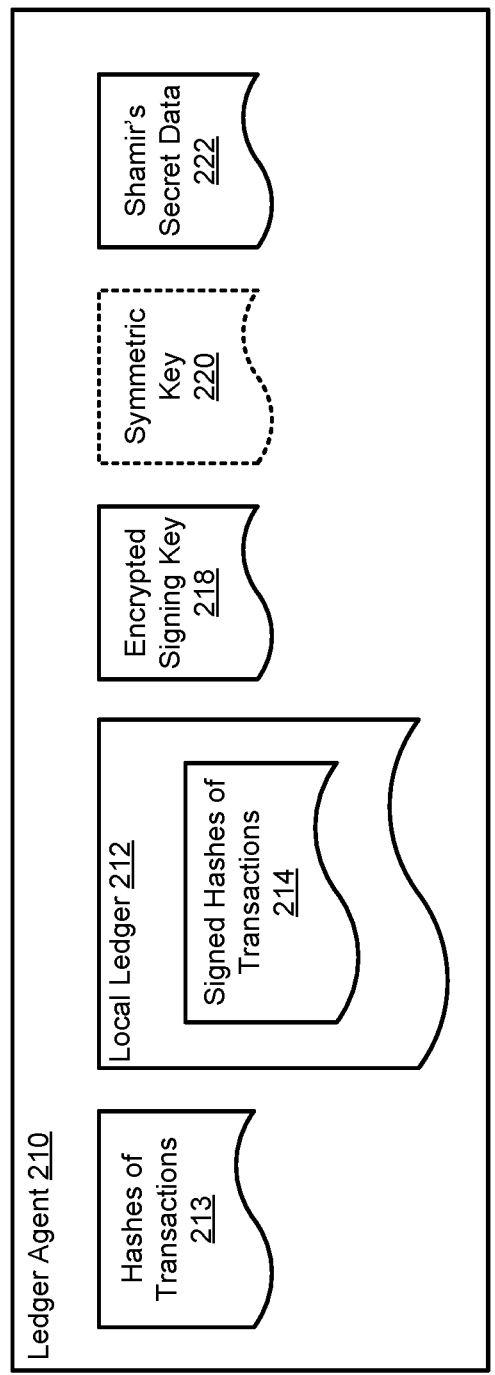

When serving as a ledger agent, the edge device may (i) obtain hashes of transactions from transmitting devices, (ii) maintain a ledger of hashes of transactions, (iii) sign hashes added to the ledger using a private key, (iv) protect the private key using KEK algorithms to generally encrypt the private key while not in use, and (v) protect encryption/decryption keys using in the KEK algorithm using a distributed key protection algorithm (e.g., Shamir's secret sharing) and participated in by various ledger agents. Solving for the decryption code for the distributed key protection algorithm may permit decryption of private keys usable to sign the hashes. Refer to FIGS. 2A-2B for additional details regarding solving of the distributed key protection algorithm for signed hashed transactions.

Data storage system 104 may provide data storage service. To provide the data storage services, data storage system 104 may host a database and/or other data structure in which data is stored. The stored data may be updated using transactions received from edge devices of edge deployment 100. Prior to utilizing a transaction to update the data in the database, data storage system 104 may (i) validate integrity of the transaction using a consistent hash of the transaction provided by the ledger agents, and (ii) add validated transactions to a ledger.

To establish a consistent hash, data storage system 104 may obtain hashes (alleged to be for the transaction) from a quorum of the ledger agents until a consistent hash is obtained. Only hashes that are signed using the private key protected by KEK may be trusted by data storage system 104 for purposes of establishing the consistent hash. Once obtained, the consistent hash may be used to verify the integrity of the transaction (e.g., by generating a hash of the transaction and comparing it to the consistent hash). Refer to FIG. 2C for additional details regarding verification and use of transactions.

Figure 3:
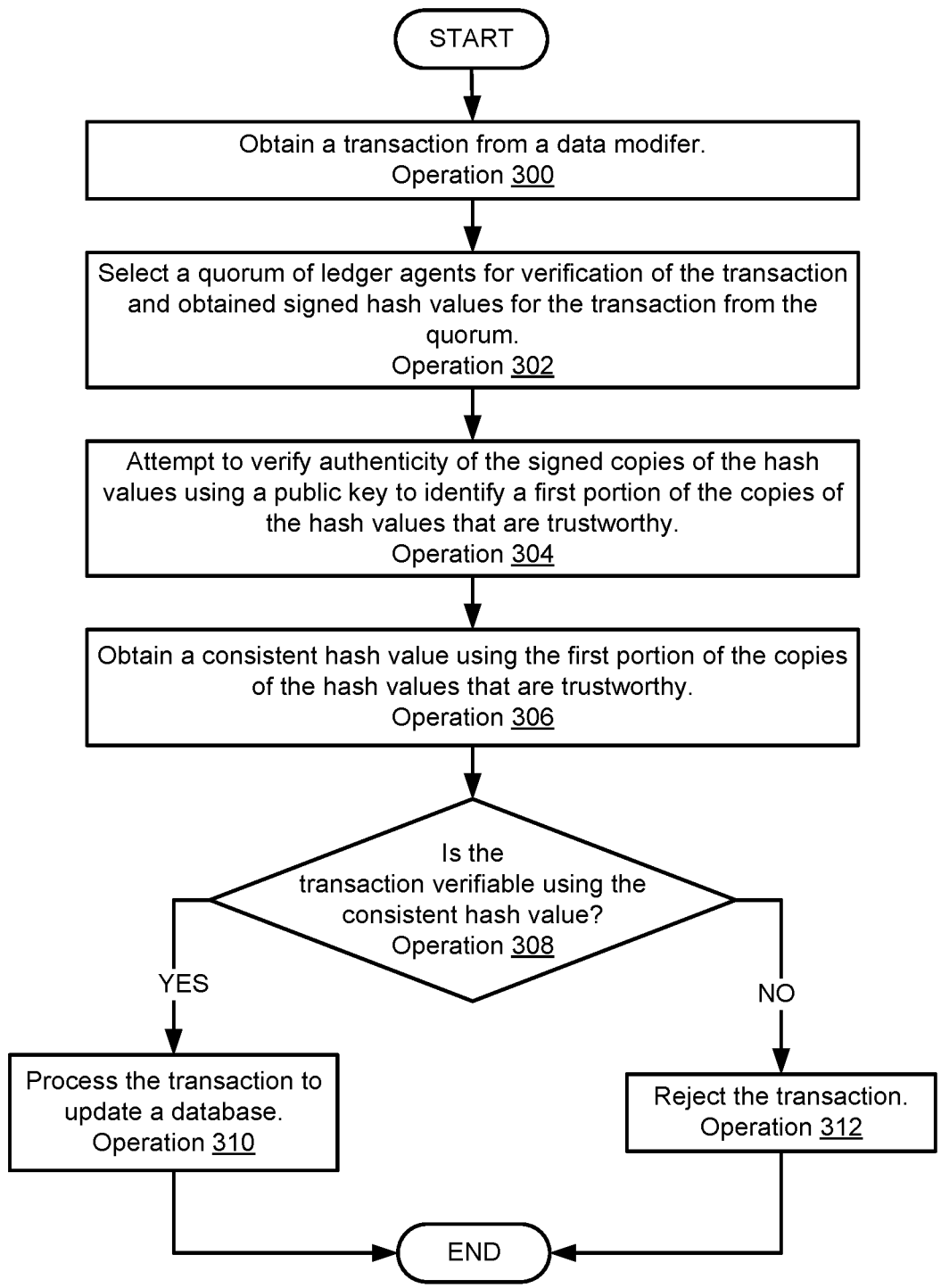
FIG. 3 shows a flow diagram illustrating a method in accordance with an embodiment.

When providing their functionality, any of (and/or components thereof) edge deployment 100 and data storage system may perform all, or a portion, of the method shown in FIG. 3.

Any of (and/or components thereof) edge deployment 100 and data storage system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 212, 218, etc.) is used to represent data structures, a second set of shapes (e.g., 236, etc.) is used to represent large scale data structures such as databases.

Turning to FIG. 2A, a first data flow diagram in accordance with an embodiment is shown. The first data flow diagram may illustrate data used in and data processing performed in storing data in data storage system 104.

To store data in data storage system 104, different edge devices may dynamically take on different roles. For example, when stored data in storage system, a first edge device may take on the role of data modifier 202 and a group of other edge devices may take on the roles of ledgers agents (e.g., 204A-204N) of a ledger system (e.g., 204).

When the first edge device takes on the data modifier 202 role, the first edge device may generate transactions to store data in data storage system 104. A transaction may specify a change to data such as, for example, an addition of new data, a change to existing data, and/or deletion of existing data. The first edge device may do so based on collected data, processes performed by that change existing data, and/or for other reasons.

Once a transaction is obtained, the first edge device may generate a hash of the transaction so that the integrity of the transaction may be verified by data storage system 104 prior to processing the transaction.

Shown at (1) on FIG. 2A, data modifier 202 may send a copy of the transaction to data storage system 104. When the transaction is received, data storage system 104 may first verify the transaction prior to processing it.

To facilitate verification of integrity of the transaction, shown at (2), data modifier 202 may send copies of the hash of the transaction to ledger agent 204A-204N of ledger system 204.

When the copies of the hash are received by the ledger agents, each ledger agent may (i) sign the hash of the transaction using a private key protected by KEK encryption, (ii) append the signed hash to a ledger, and (iii) distribute copies of the signed hash to data storage system 104 upon request by data storage system 104.

The private key may be protected by KEK using a symmetric key that is, in turn, protected by Shamir's secret algorithm or another distributed secret protection algorithm. Thus, to gain access to the private key, each ledger agent may need to complete Shamir's secret algorithm cooperatively with other ledger agents to gain temporary access to the symmetric key, and use the symmetric key to decrypt the private key for temporary use in signing. Once used for signing purposes, the unprotected copies of the symmetric key and private key may be discarded until needed again in the future to sign additional hashes. Refer to FIG. 2B for additional details regarding signed hashes of the transaction.

To verify each transaction, shown at (3), data storage system 104 may select a quorum of ledger agents 204A-204N, which may include more than half of the set of ledger agents 204A-204N. Using the quorum of ledger agents 204A-204N, data storage system 104 may request and obtain alleged copies of the hash for of the transaction from each ledger agents. Data storage system 104 may verify that each received hash is signed with the private key (e.g., using a corresponding public key), and compare the hash values to determine whether a consistent has value has been obtained.

If a consistent hash value has not been obtained, then membership in the quorum may be changed, and hash values may be requested from the updated quorum. The aforementioned process may be repeated until a consistent hash value is obtained.

To verify the transaction, a new hash of the transaction may be generated and compared to the consistent value. If the new hash matches the consistent hash, then it may be concluded that the integrity of the transaction has been maintained during its travel between data modifier 202 and data storage system 104. In contrast, it may be concluded that the integrity of the transaction has not been maintained if the new and consistent hash do not match.

If the integrity of the transaction has been maintained, then the transaction may be (i) appended to a transaction ledger, and (ii) the transaction may be processed to cause data to be stored for data modifier 202 in data storage system 104. Refer to FIG. 2C for additional details regarding processing of transactions by data storage system 104.

Turning to FIG. 2B, a second data flow diagram illustrating data structures used in encryption of data structures in accordance with an embodiment is shown.

Turning to FIG. 2B, a second data flow diagram in accordance with an embodiment is shown. The second data flow diagram may illustrate data used in and data processing performed in management of hashes of transactions.

To manage hashes of transactions, as noted above, copies of hashes of transactions 213 may be distributed to edge devices operating as ledger agents (e.g., 210, may be similar to any of the ledger agents discussed with respect to FIG. 2A). When received by ledger agent 210, ledger agent 210 may (i) sign each hash of a transaction, and (ii) add the signed hash to local ledger 212.

To sign each hash, ledger agent 210 may use a signing key that is protected by KEK. For example, ledger agent 210 may store a copy of encrypted signing key 218 that was encrypted using symmetric key 220. An unprotected copy of the signing key may not be maintained by ledger agent 210. For example, ledger agent 210 may be programmed to automatically discard unprotected copies of the signing key after the signing key is used to sign a hash of a transaction. Thus, ledger agent 210 may be required to gain access to the unprotected (e.g., not encrypted) copy of the signing key to sign each hash.

Symmetric key 220 may be a symmetric key (e.g., usable to encrypt/decrypt) that may be protected using a distributed secret management algorithm such as, for example, Shamir's secret. To participate in Shamir's secret keeping algorithm, ledger agent 210 may store a portion of Shamir's secret data 222. The other required portions of Shamir's secret data may be stored by other ledger agents and/or the data modifier. Thus, to gain access to symmetric key 220, ledger agent 210 may need to cooperatively participate in the algorithm with other ledger agents and/or the modifier.

For example, the different portions of Shamir's secret data 222 may need to be used in conjunction with other portions (e.g., a quorum of entities having portions of Shamir's secret data) to gain access to symmetric key 220.

Once symmetric key 220 is obtained, the copy of encrypted signing key 218 may be decrypted to gain temporary access to the signing. The signing key may be used to sign hashes of transactions 213 to obtain signed hash of transactions 214. Signed hashes of transactions 214 may be appended to local ledger 212.

Once appended, signed hash of transactions 214 may be used to service requests for copies of hashes from the data storage system.

Turning to FIG. 2C, a third data flow diagram in accordance with an embodiment is shown. The third data flow diagram may illustrate data used in and data processing performed in processing of transactions.

To process transactions, when a transaction (e.g., 230) is obtained, a quorum of ledger agents may be selected. Requests for hashes for transaction 230 may be made to each of the ledger agents of the quorum. Each ledger agent of the quorum may provide a signed hash responsive to the request.

When obtained, each signed hash may be verified using a trusted public key 234 corresponding to the private key that is required to sign each hash, and protected using KEK and Shamir's secret protection algorithm. Any unverifiable signed hashes may be discarded, and the remaining verified hashes may be aggregated as verified hashes for transaction 231. The hashes of verified hashes for transaction 231 may be compared to each other to identify if a consistent hash for the transaction (e.g., 232) has been established. In other words, whether all of the hashes match.

If a consistent hash for the transaction has not been obtained, then a new quorum of ledger agents may be selected using any selection process. The aforementioned process may then be repeated to attempt to obtain a consistent hash value for the transaction.

Once a consistent hash value for the transaction has been obtained, then to verify the integrity of transaction 230 a new hash of the transaction may be obtained (e.g., generated) and compared to the consistent hash value. If the new and consistent hash value match, then it may be concluded that the integrity of transaction 230 has been maintained.

If the integrity has been maintained, then transaction 230 may be added to transaction ledger 238 and transaction 230 may be processed to update the content of database 236.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flows shown in FIGS. 2A-2C, data may be securely aggregated from any number of edge devices and stored in a data storage system.

As discussed above, the components of FIG. 1 may perform various methods to manage operations on edge deployment 100 and data storage system 104. FIG. 3 illustrates a method that may be performed by the components of FIG. 1. In the diagram discussed below and shown in FIG. 3, any of the operations may be repeated, performed in different orders, and/or performed in parallel with and/or in a partially overlapping in time manner with other operations.

Turning to FIG. 3, a flow diagram illustrating a method of storing data in accordance with an embodiment is shown. The method may be performed, for example, by one or more of edge device 100A-100N, data storage system 104, and/or other components of the system of FIG. 1.

At operation 300, a transaction may be obtained from a data modifier. The transaction may be obtained by receiving the transaction from the data modifier.

At operation 302, a quorum of ledger agents for verification of the transaction is selected. The ledger agents for the quorum may be selected using a selection algorithm that does not allow the ledger agents that will be selected to be identified prior to the selection. For example, the ledger agents may be selected randomly, with some preference for ledger agents that have been less frequently selected for membership in quorums, etc.

Additionally, signed hash values for the transaction are obtained from the ledger agents of the quorum. Each signed hash value is alleged by the respective ledger agent to be a hash of the transaction. Thus, all of the hash values should match one another if the system is operating as expected and none of the components are compromised or subject to errors in operation.

At operation 304, an attempt to verify authenticity of each of the signed copies of the hash values is made using a public key. The attempt may be made by using the public key to verify the signature for each hash and/or integrity of the hash using a signature verification algorithm. The attempt may result in identifying a portion (which may include all or only some) of the copies of the hash values that are trustworthy (i.e., have valid signatures and verified that the integrity of the hash is maintained).

At operation 306, a consistent hash value is obtained using the first portion of the copies of the hash values. The consistent hash value may be obtained comparing the hash values from the first portion to each other to see if they all match (e.g., are duplicative of one another). If all match, then the consistent hash value may be the matching value.

If not all of the hash values match, then some of the hash values that do not match a majority of the hash values that do match may be discarded, different ledger agents (e.g., equal to the number of discarded hash value) may be selected and new hashes for the transaction may be obtained from these different ledger agents.

The aforementioned matching process may then be repeated for the new hashes and retained hashes to attempt to identify a consistent hash value. This process may be repeated until a consistent hash value for the transaction is obtained.

At operation 308, a determination is made regarding whether the transaction is verifiable using the consistent hash value. The determination may be made by (i) computing a new hash for the transaction, and (ii) comparing the new hash value to the consistent hash value. If they match, then it may be concluded that the transaction is verifiable.

If the transaction is verifiable, then the method may proceed to operation 310. Otherwise, the method may proceed to operation 312.

At operation 310, the transaction is processed to update a database. The transaction may be processed by performing data modification instructions included in the transaction. Additionally, the transaction may be added to a transaction ledger.

The method may end following operation 310.

Returning to operation 308, the method may proceed to operation 312 following operation 308 when the transaction is not verifiable.

At operation 312, the transaction may be rejected. In other words, the transactions may be discarded without modifying the database.

The method may end following operation 312.

Figure 4:
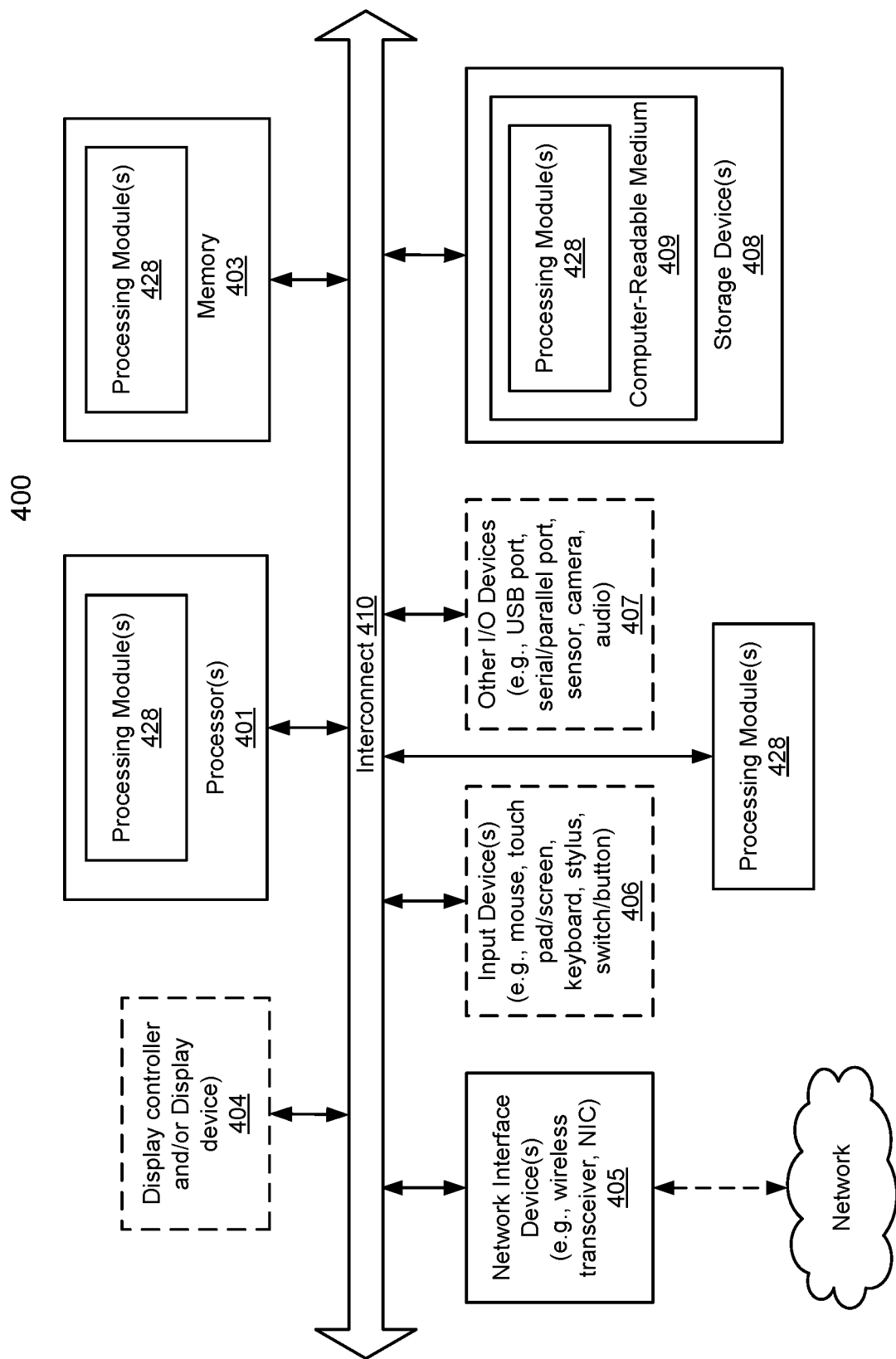
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for storing data in a distributed system, the method comprising:
   obtaining a transaction from a data modifier, the transaction documenting a change to data maintained by a database;
   responsive to obtaining the transaction:
      selecting ledger agents for verification of the transaction, the ledger agents storing hash values usable to verify the transaction;
      obtaining signed copies of the hash values from the ledger agents;
      attempting to verify authenticity of the signed copies of the hash values using a public key to identify a first portion of the copies of the hash values that are trustworthy;
      obtaining a consistent hash value using the first portion of the copies of the hash values that are trustworthy;
      attempting to verify the transaction using the consistent hash value;
      in a first instance of the attempting to verify the transaction where the transaction is verifiable:
         processing the transaction to update the database;
      in a second instance of the attempting to verify the transaction where the transaction cannot be verified:
         rejecting the transaction.

2. The method of claim 1, wherein the data modifier generates the hash values and provides them to the ledger agents.

3. The method of claim 1, wherein selecting the ledger agents comprises:
   selecting, by a random selection process, a subset of ledger agents from a set of ledger agents, the subset comprising more than half of all of the ledger agents from the set of the ledger agents.

4. The method of claim 3, wherein obtaining the consistent hash value comprises:
   identifying duplicative hash values of the hash values; and
   in a first instance of the identifying the duplicative hash values where all of the hash values are the duplicative hash values:
      using the duplicative hash values as the consistent hash value;
   in a second instance of the identifying the duplicative hash values where all of the hash values are not the duplicative hash values:
      isolating a portion of the ledger agents that provided the hash values that are not the duplicative hash values;
      selecting a new portion of the ledger agents, a size of the new portion of the ledger agents equal to a size of the portion of the ledger agents that provided the hash values that are not the duplicative hash values;
      obtaining additional hash values from the new portion of the ledger agents to attempt to obtain the consistent hash value.

5. The method of claim 1, wherein the public key is a member of a public-private key pair, signatures of the signed copies of the hash values being based on a private key of the public-private key pair, the private key being protected by the ledger agents using key encryption key based on a symmetric key, the symmetric key being protected by the ledger agents using a distributed key protection algorithm.

6. The method of claim 5, wherein the distributed key protection algorithm is Shamir's Secret Protection Algorithm.

7. The method of claim 1, wherein a first communication path for the transaction is between the data modifier and the database and is separate from a second communication path between the ledger agents and the database.

8. The method of claim 1, wherein attempting to verify the transaction using the consistent hash value comprises:
 computing a second hash value of the transaction;
 comparing the second hash value of the transaction with the consistent hash value;
 in a first instance of the comparing where the second hash value is duplicative of the consistent hash value:
  treating the consistent hash value as being verified;
 in a second instance of the comparing where the second hash value is not duplicative of the consistent hash value:
  treating the consistent hash value as being unverifiable.

9. The method of claim 1, wherein processing the transaction comprises:
 updating a local copy of a transaction ledger with the transaction; and
 applying changes of the transaction to the database.

10. A non-transitory machine-readable medium having instructions stored therein, which when executed by a processor, cause the processor to perform operations for storing data in a distributed system, the operation comprising:
 obtaining a transaction from a data modifier, the transaction documenting a change to data maintained by a database;
 responsive to obtaining the transaction:
  selecting ledger agents for verification of the transaction, the ledger agents storing hash values usable to verify the transaction;
  obtaining signed copies of the hash values from the ledger agents;
  attempting to verify authenticity of the signed copies of the hash values using a public key to identify a first portion of the copies of the hash values that are trustworthy;
  obtaining a consistent hash value using the first portion of the copies of the hash values that are trustworthy;
  attempting to verify the transaction using the consistent hash value;
  in a first instance of the attempting to verify the transaction where the transaction is verifiable:
   processing the transaction to update the database;
  in a second instance of the attempting to verify the transaction where the transaction cannot be verified:
   rejecting the transaction.

11. The non-transitory machine-readable medium of claim 10, wherein the data modifier generates the hash values and provides them to the ledger agents.

12. The non-transitory machine-readable medium of claim 10, wherein selecting the ledger agents comprises:
 selecting, by a random selection process, a subset of ledger agents from a set of ledger agents, the subset comprising more than half of all of the ledger agents from the set of the ledger agents.

13. The non-transitory machine-readable medium of claim 12, wherein obtaining the consistent hash value comprises:
 identifying duplicative hash values of the hash values; and
 in a first instance of the identifying the duplicative hash values where all of the hash values are the duplicative hash values:
  using the duplicative hash values as the consistent hash value;
 in a second instance of the identifying the duplicative hash values where all of the hash values are not the duplicative hash values:
  isolating a portion of the ledger agents that provided the hash values that are not the duplicative hash values;
  selecting a new portion of the ledger agents, a size of the new portion of the ledger agents equal to a size of the portion of the ledger agents that provided the hash values that are not the duplicative hash values;
  obtaining additional hash values from the new portion of the ledger agents to attempt to obtain the consistent hash value.

14. The non-transitory machine-readable medium of claim 10, wherein the public key is a member of a public-private key pair, signatures of the signed copies of the hash values being based on a private key of the public-private key pair, the private key being protected by the ledger agents using key encryption key based on a symmetric key, the symmetric key being protected by the ledger agents using a distributed key protection algorithm.

15. The non-transitory machine-readable medium of claim 14, wherein the distributed key protection algorithm is Shamir's Secret Protection Algorithm.

16. A data processing system, comprising:
 a processor; and
 a memory coupled to the processor to store instructions, which when executed by the processor, cause the processor to perform operations for storing data in a distributed system, the operations comprising:
  obtaining a transaction from a data modifier, the transaction documenting a change to data maintained by a database;
  responsive to obtaining the transaction:
   selecting ledger agents for verification of the transaction, the ledger agents storing hash values usable to verify the transaction;
   obtaining signed copies of the hash values from the ledger agents;
   attempting to verify authenticity of the signed copies of the hash values using a public key to identify a first portion of the copies of the hash values that are trustworthy;
   obtaining a consistent hash value using the first portion of the copies of the hash values that are trustworthy;
   attempting to verify the transaction using the consistent hash value;
   in a first instance of the attempting to verify the transaction where the transaction is verifiable:
    processing the transaction to update the database;
   in a second instance of the attempting to verify the transaction where the transaction cannot be verified:
    rejecting the transaction.

17. The data processing system of claim 16, wherein the data modifier generates the hash values and provides them to the ledger agents.

18. The data processing system of claim 16, wherein selecting the ledger agents comprises:
 selecting, by a random selection process, a subset of ledger agents from a set of ledger agents, the subset comprising more than half of all of the ledger agents from the set of the ledger agents.

19. The data processing system of claim 18, wherein obtaining the consistent hash value comprises:

identifying duplicative hash values of the hash values; and
in a first instance of the identifying the duplicative hash values where all of the hash values are the duplicative hash values:
  using the duplicative hash values as the consistent hash value;
in a second instance of the identifying the duplicative hash values where all of the hash values are not the duplicative hash values:
  isolating a portion of the ledger agents that provided the hash values that are not the duplicative hash values;
  selecting a new portion of the ledger agents, a size of the new portion of the ledger agents equal to a size of the portion of the ledger agents that provided the hash values that are not the duplicative hash values;
  obtaining additional hash values from the new portion of the ledger agents to attempt to obtain the consistent hash value.

20. The data processing system of claim 16, wherein the public key is a member of a public-private key pair, signatures of the signed copies of the hash values being based on a private key of the public-private key pair, the private key being protected by the ledger agents using key encryption key based on a symmetric key, the symmetric key being protected by the ledger agents using a distributed key protection algorithm.

* * * * *